United States Patent
Nagata

(10) Patent No.: US 9,041,948 B2
(45) Date of Patent: May 26, 2015

(54) IMAGE PROCESSING APPARATUS, SECURITY SYSTEM SUPPLIED WITH IMAGE PROCESSING APPARATUS, IMAGE PROCESSING METHOD AND STORAGE MEDIUM

(71) Applicant: Tadashi Nagata, Kanagawa (JP)

(72) Inventor: Tadashi Nagata, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/445,119

(22) Filed: Jul. 29, 2014

(65) Prior Publication Data

US 2015/0036161 A1    Feb. 5, 2015

(30) Foreign Application Priority Data

Aug. 1, 2013   (JP) .................................. 2013-160500
Apr. 28, 2014  (JP) .................................. 2014-092233

(51) Int. Cl.
*G06F 3/12* (2006.01)
*H04N 1/00* (2006.01)

(52) U.S. Cl.
CPC ......... *H04N 1/0088* (2013.01); *H04N 1/00896* (2013.01); *H04N 1/00278* (2013.01); *H04N 2201/0081* (2013.01)

(58) Field of Classification Search
USPC .......... 358/1.13, 1.15, 1.1, 1.6, 530, 540, 401, 358/413, 448, 296, 302, 305; 382/115, 100, 382/118, 103, 106, 190, 218, 107, 181, 232, 382/276; 348/143, 207.1, 68, 14, 16, 14.04, 348/14.05, 14.1, 208.1, 211.1, 211.2, 164, 348/169, 211.14, 231.4, 333.13, 152, 154, 348/155, 3, 71

See application file for complete search history.

(56) References Cited

U.S. PATENT DOCUMENTS

| RE39,550 E | * | 4/2007 | Suzuki et al. ..................... 726/2 |
| 2007/0063840 A1 | * | 3/2007 | Jentoft .......................... 340/541 |
| 2012/0147184 A1 | * | 6/2012 | Siann et al. .................. 348/143 |

FOREIGN PATENT DOCUMENTS

| JP | 3372889 | 2/2003 |
| JP | 3745663 | 2/2006 |
| JP | 2014-027393 | 2/2014 |

OTHER PUBLICATIONS

Takahashi Toshio, Image Forming Device and Crime Prevention System Using the Same, Mar. 20, 2003, Machine Translation Japanese Patent Publication, JP2003087775, All Pages.*

* cited by examiner

*Primary Examiner* — Ngon Nguyen
(74) *Attorney, Agent, or Firm* — Harness, Dickey & Pierce, P.L.C.

(57) ABSTRACT

An image processing apparatus includes an intrusion detection unit that detects an intrusion of an intruder; an imaging unit that images a monitor area; an imaging control unit that activates the imaging unit and causes the imaging unit to start imaging; and an imaging instruction unit that instructs the imaging control unit to activate the imaging unit and cause the imaging unit to start imaging, in a case where the image processing apparatus is in an energy-saving mode, in which the imaging unit is inactive, when the intrusion detection unit detects the intrusion of the intruder, without switching the energy-saving mode to a normal mode, in which the imaging unit and an image forming unit for forming an image on a recording medium are active.

11 Claims, 7 Drawing Sheets

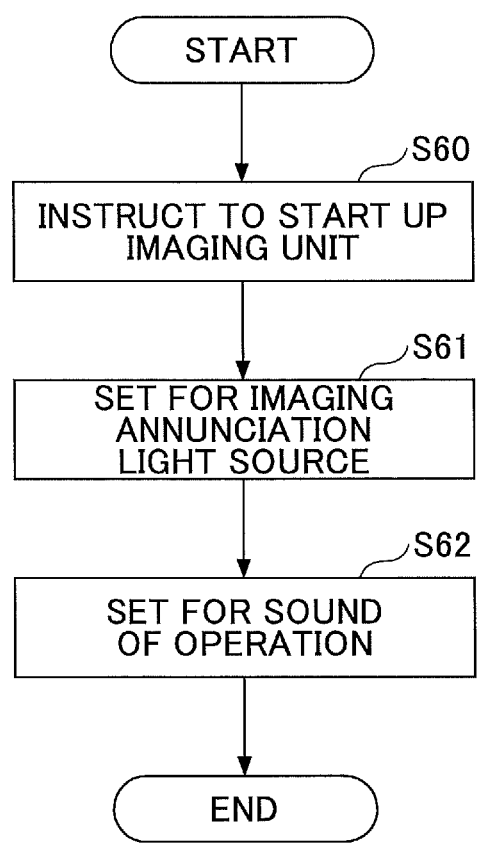

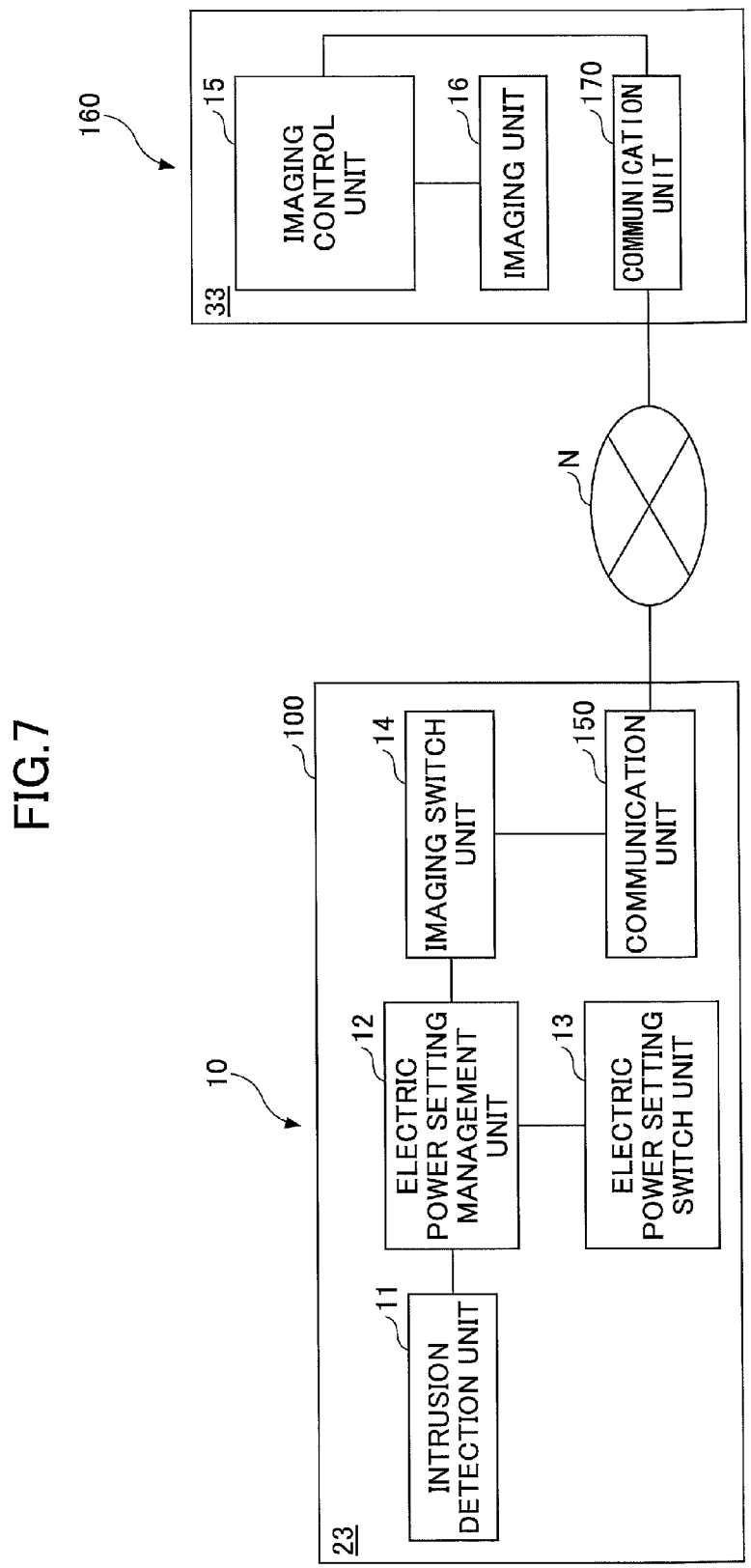

IMAGE PROCESSING APPARATUS, SECURITY SYSTEM SUPPLIED WITH IMAGE PROCESSING APPARATUS, IMAGE PROCESSING METHOD AND STORAGE MEDIUM

BACKGROUND OF THE INVENTION

1. Field of the Invention

The disclosures herein generally relate to an image processing apparatus, a security system supplied with the image processing apparatus, an image processing method and a storage medium.

2. Description of the Related Art

Various methods of using an MFP (multifunction peripheral) equipped with plural functions such as a copier, a facsimile apparatus or a printer as a security apparatus for a monitoring apparatus for monitoring an intrusion of an intruder in a building have been proposed.

As the above-described MFP, for example, Japanese Patent No. 3745663 discloses an image processing apparatus equipped with a security application program that detects an intruder by an infrared sensor and an imaging unit and reports to a specified destination.

The above-described image processing apparatus generally transitions to an energy saving mode after a predetermined time without any operations.

Intrinsically, a situation that especially requires a security mode is a state where no one is present in an office due to going home, going outside, having a meeting or the like. However, the image processing apparatus then transitions to the energy saving mode, as described above.

When an intrusion of an intruder is detected during in the energy saving mode, the image processing apparatus must restart respective functions so as to change from the energy saving mode to the imaging mode. When the respective functions are restarted, an initial (return) operating sound by a rotation of a photoreceptor or a process control operation occurs and the intruder may recognize it. There is a problem that when the intruder knows the existence of the image processing apparatus supplied with the security mode, the intruder gets away from the image processing apparatus and the imaging unit cannot image the intruder.

SUMMARY OF THE INVENTION

It is a general object of at least one embodiment of the present invention to provide an image processing apparatus, a security system, an image processing method and a storage medium thereof that substantially obviate one or more problems caused by the limitations and disadvantages of the related art.

In one embodiment, an image processing apparatus includes an intrusion detection unit that detects an intrusion of an intruder; an imaging unit that images a monitor area; an imaging control unit that activates the imaging unit and causes the imaging unit to start imaging; and an imaging instruction unit that instructs the imaging control unit to activate the imaging unit and cause the imaging unit to start imaging, in a case where the image processing apparatus is in an energy-saving mode, in which the imaging unit is inactive, when the intrusion detection unit detects the intrusion of the intruder, without switching the energy-saving mode to a normal mode, in which the imaging unit and an image forming unit for forming an image on a recording medium are active.

In another embodiment, a security system includes an image processing apparatus; and an imaging device connected with the image processing apparatus via a network. The imaging device includes an imaging unit that images a monitor area; and an imaging control unit that activates the imaging unit and causes the imaging unit to start imaging. The image processing apparatus includes an intrusion detection unit that detects an intrusion of an intruder; and an imaging instruction unit that instructs the imaging control unit to activate the imaging unit and cause the imaging unit to start imaging, in a case where the image processing apparatus is in an energy-saving mode, in which the imaging unit is inactive, when the intrusion detection unit detects the intrusion of the intruder, without switching the energy-saving mode to a normal mode, in which the imaging unit and an image forming unit for forming an image on a recording medium are active.

In yet another embodiment, an image processing method of an image processing apparatus includes detecting an intrusion of an intruder; activating an imaging unit and instructing the imaging unit to start imaging, in a case where the image processing apparatus is in an energy-saving mode, in which the imaging unit is inactive, when the intrusion of the intruder is detected, without switching the energy-saving mode to a normal mode, in which the imaging unit and an image forming unit for forming an image on a recording medium are active; and imaging a monitor area with the imaging unit.

In yet another embodiment, a non-transitory computer-readable storage medium stores a program for causing a computer to perform a process of processing an image in an image processing apparatus. The process includes a step of detecting an intrusion of an intruder; a step of activating an imaging unit and instructing the imaging unit to start imaging, in a case where the image processing apparatus is in an energy-saving mode, in which the imaging unit is inactive, when the intrusion of the intruder is detected, without switching the energy-saving mode to a normal mode, in which the imaging unit and an image forming unit for forming an image on a recording medium are active; and a step of imaging a monitor area with the imaging unit.

According to an embodiment of the present invention, an image processing apparatus that can image an intruder by an imaging unit without being recognized by the intruder is provided.

BRIEF DESCRIPTION OF THE DRAWINGS

Other objects and further features of embodiments will be apparent from the following detailed description when read in conjunction with the accompanying drawings, in which:

FIG. 6 is a flowchart illustrating an example of a flow of setup processing in the image processing apparatus according to the first embodiment; and FIG. 7 is a diagram illustrating an example of a functional configuration of a security system according to a second embodiment.

DESCRIPTION OF THE PREFERRED EMBODIMENTS

Figure 1:
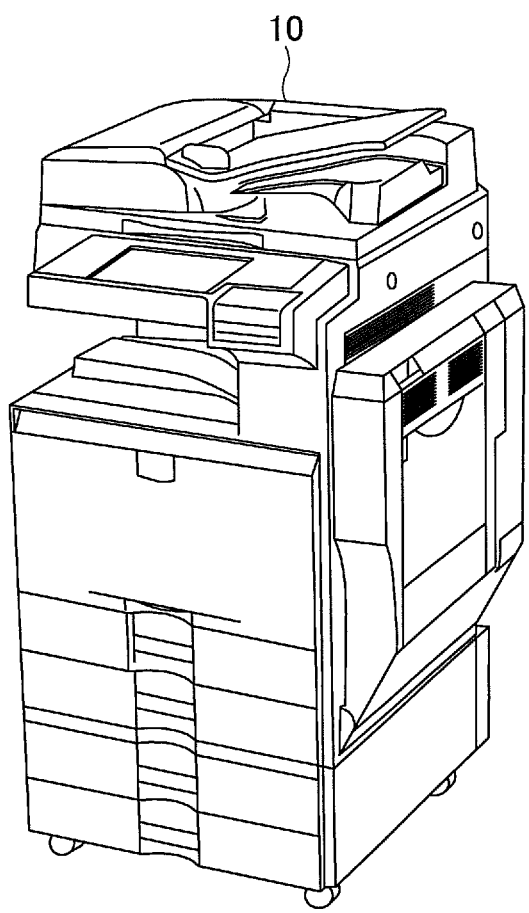
FIG. 1 is a diagram illustrating an example of an image processing apparatus according to a first embodiment.

In the following, embodiments of the present invention will be described with reference to the accompanying drawings. However, the present invention is not limited to the examples described in the following. Meanwhile, in the following explanations, to the same or corresponding function parts or configuration parts described in the whole accompanying drawings, the same or corresponding reference numerals are assigned, and duplicate explanation is omitted.

First Embodiment

Image Processing Apparatus

Schematic Configuration

FIG. 1 is a diagram illustrating an example of an image processing apparatus according to the first embodiment. The image processing apparatus 10 shown in FIG. 1 is, for example, a multifunction peripheral (MFP) that realizes two or more functions of printing, scanning, copying, communicating by facsimile (FAX) and the like in one chassis. However, a device alone having any one of the functions may be used as the image processing apparatus 10. Moreover, the image processing apparatus 10, according to content of an image processing service to be provided, may be an image processing apparatus including a projector or the like.

The image processing apparatus 10 according to the first embodiment includes an intrusion detection unit that detects an intrusion of an intruder and an imaging unit that images the intruder in the chassis.

<Hardware Configuration>

Figure 2:
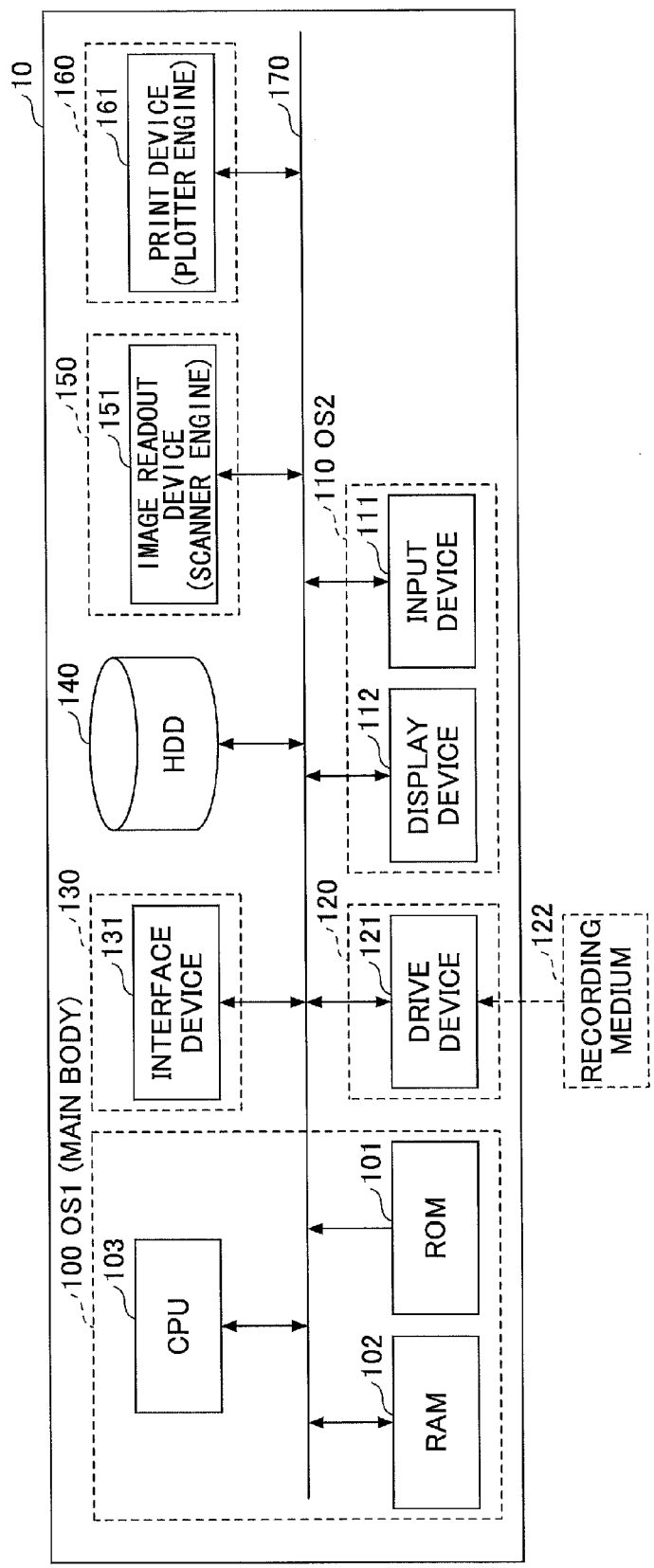
FIG. 2 is a diagram illustrating an example of a hardware configuration of the image processing apparatus according to the first embodiment.

FIG. 2 is a diagram illustrating an example of a hardware configuration of the image processing apparatus 10 according to the first embodiment.

The image processing apparatus 10 includes a main body 100, an operation unit 110, a recording medium I/F (interface) 120, a data communication I/F 130, a hard disk drive (HDD) 140, a scanner 150, and a plotter 160, which are connected via a PCI (peripheral component interconnect) bus 170 to each other.

The main body 100 includes a ROM (read only memory) 101, a RAM (random access memory) 102 and a CPU (central processing unit) 103. The ROM 101 stores a program executed at the time of start-up of the image processing apparatus 10 or various data. Moreover, the RAM 102 temporarily holds various software programs read out from the ROM 101 or the HOD 140 or data. The CPU 103 runs various software programs on an operating system 1, which will be called OS 1 in the following, stored in the ROM 101 or the HDD 140.

The operation unit 110 includes an input device 111 and a display device 112. The input device 111 includes hardware keys or the like, and is used for inputting various operation signals into the image processing apparatus 10. Moreover, the display device 112 includes a display screen or the like, and displays, for example, a variety of information related to an image forming operation. Moreover, in the operation unit 110, various software programs operate on a specific operating system, which will called OS 2 in the following, different from the main body 100. In the present embodiment, the operation of an imaging unit 16 (See FIG. 4) is executed by the OS 2 of the operation unit 110, which will described later.

The recording medium I/F 120 includes a drive device 121. When a recording medium 122 is mounted in the drive device 121, various data recorded in the recording medium 122 are stored into the HDD 140 via the drive device 121.

The data communication I/F 130 includes an interface device 131. The data communication I/F 130 is an interface that connects to a data transmission path to the inside or the outside of the image processing apparatus 10.

The HDD 140 stores various data such as received document data or readout image data to be processed in the image processing apparatus 10. Moreover, the HDD 140 manages the above-described various data in a predetermined file system or a database (DB). The various data stored in the HDD 140 include, for example, imaging information such as images or video pictures imaged by the imaging unit 16, which will be described later, or an imaging time and date. The above-described imaging information may be uploaded via a network or the like as the data transmission path.

The scanner 150 includes an image readout device 151 (scanner engine), reads out a manuscript arranged on a readout surface, and generates image data.

The plotter 160 includes a print device 161 (plotter engine), and prints, for example, a bitmap image on a recording paper by an electrophotographic process.

The image processing apparatus 10 in the present embodiment, according to the above-described hardware configuration, realizes plural functions such as copying, printing, communicating by facsimile, scanning or the like, an information retrieval function, a communication function including short-range communication and an authentication function.

The image processing apparatus 10, as described above, has a feature in that the operating system executed in the main body 100 corresponding to a main body of the image processing apparatus 10 is different from that executed in the operation unit 110. Next, software configurations of the main body 100 and of the operation unit 11 will be explained.

<Software Configuration>

Figure 3:
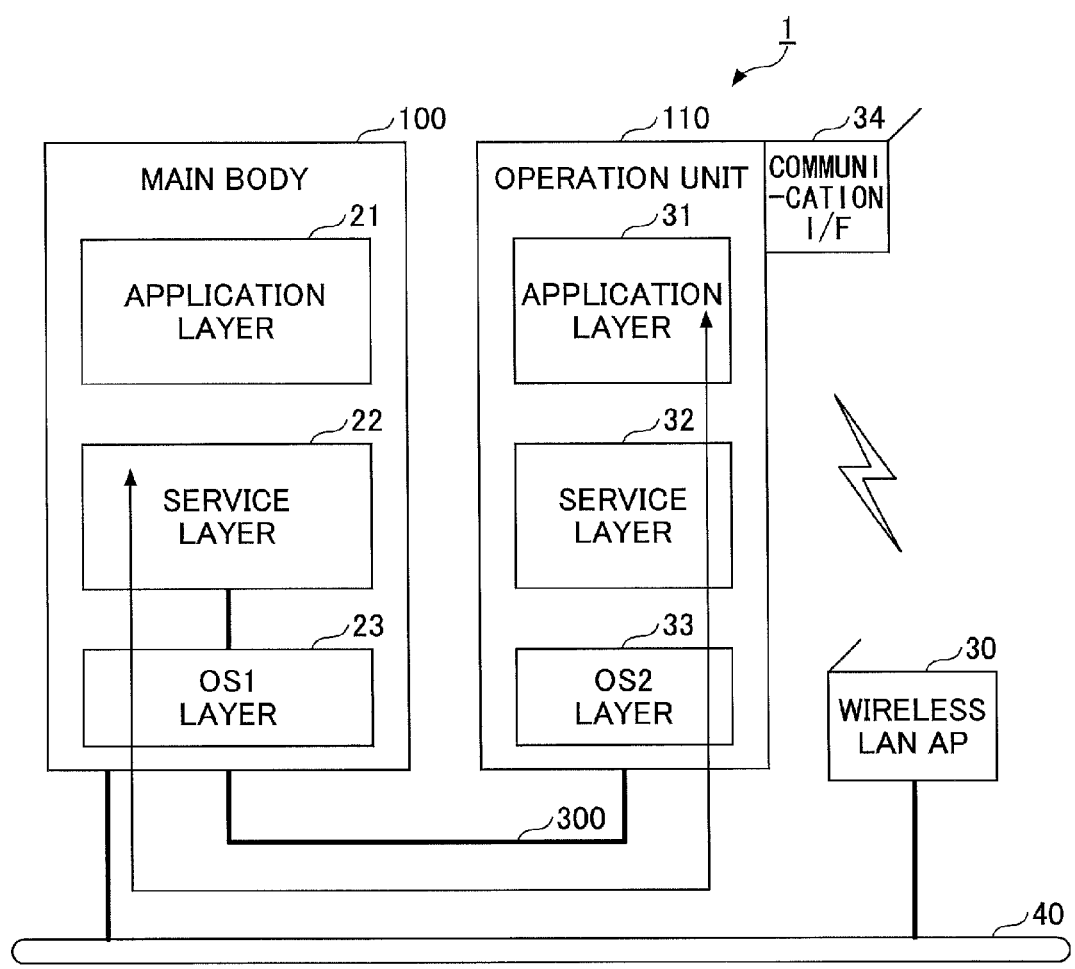
FIG. 3 is a diagram illustrating an example of a software configuration of the image processing apparatus according to the first embodiment.

The software configuration of the image processing apparatus 10, which has the above-described configuration, will be explained. FIG. 3 is a schematic diagram illustrating an example of a software configuration of the image processing apparatus 10 according to the present embodiment. As shown in FIG. 3, the main body 100 includes an application layer 21, a service layer 22 and an OS1 layer 23. The application layer 21, the service layer 22 and the OS1 layer 23 are substantially various software programs stored in the above-described ROM 101, the HDD 140 or the like. By the CPU 103 executing these software programs, various functions are provided.

The software program of the application layer 21 is application software, which may be simply called an application in the following explanation, that makes the hardware resource work to provide a predetermined function. For example, the application is a copying application that provides a copying function, a scanner application that provides a scanner function, a facsimile application that provides a facsimile function, a printer application that provides a printer function or the like.

The software program of the service layer 22 is software that intervenes between the application layer 21 and the OS1 layer 23, and provides to the application an interface to use the hardware resource, with which the main body 100 is equipped. More specifically, it is software that provides a function of receiving an operation request for the hardware resource and a function of arbitrating the operation requests. The operation request received by the service layer 22 includes a request for readout by a scanner, a request for printing by a plotter, or the like.

Meanwhile, the function of interface by the service layer 22 is provided to not only the application layer 21 of the main body 100 but also an application layer 31 of the operation unit 110. That is, the application layer 31 (application) of the operation unit 110 can also realize a function using the hardware resource of the main body 100 via the interface function of the service layer 22.

The software program of the OS1 layer 23 is basic software (operating system) that provides basic functions for controlling the hardware with which the main body 100 is equipped. The software program of the service layer 22 converts a request for utilization for the hardware resource from various applications into a command that can be interpreted by the OS1 layer 23, and sends it to the OS1 layer 23. By the software of the OS1 layer 23 executing the command, the hardware resource operates following the request from the application.

In the same way as above, the operation unit 110 includes an application layer 31, a service layer 32 and an OS2 layer 33. A hierarchical structure of the application layer 31, the service layer 32 and the OS2 layer 33, with which the operation unit 110 is equipped, are the same as those in the main body 100. However, a function provided by an application of the application layer 31 and a kind of the request for operations acceptable by the service layer 32 are different from those in the main body 100.

The application software program of the application layer 31 may be software that makes the hardware resource, with which the operation unit 110 is provided, work to provide a predetermined function. However, the application software program is software that mainly provides a function of a user interface (UI) for performing an operation or a display related to the functions (the copying function, the scanner function, the facsimile function and the printer function), with which the operation unit 110 is provided, or a function of selling by order consumable supplies such as toner or paper used in the image processing apparatus 10. In the present embodiment, the application layer 31 includes a software program for making the imaging unit 16 work.

Moreover, the operation unit 110 is provided with a communication I/F 34 which can communicate with the data communication I/F 130 performing communication via a wireless LAN of the main body 100, and sequentially sends image information that is imaged to the HDD 140.

Meanwhile, in the present embodiment, in order to maintain independence of the functions, the software program of the OS1 layer 23 in the main body 100 and the software program of the OS2 layer 33 in the operation unit 110 are different from each other. That is, the main body 100 and the operation unit 110 operate independently from each other on the different operating systems. For example, Linux (trademark registered) may be used for the software program of the OS1 layer 23 in the main body 100, and Android (Trademark registered) may be used for the software program of the OS2 layer 33 of the OS2 layer in the operation unit 110.

As described above, in the image processing apparatus 10 according to the present embodiment, the main body 100 and the operation unit 110 operate on the different operating systems (OS1 and OS2), and communications between the main body 100 and the operation unit 110 are performed as communications between difference devices, not an interprocess communication inside a common device. An operation of transmitting an input received by the operation unit 110 (content of instruction by a user) to the main body 100 (command communication) or an operation of the main body 100 giving notice the operation unit 110 of an event corresponds to the above communication. Here, by the operation unit 110 performing the command communication with the main body 100, the function of the main body 100 can be used. Moreover, the event, of which the main body gives notice the operation unit 110, includes an execution state of the operation in the main body 100 or content set in the main body 100. Especially, in the present embodiment, the event includes an instruction for starting up the imaging unit 16 from the main body 100.

Moreover, in the present embodiment, since electric power is supplied to the operation unit 110 from the main body 100 through the communication path 300, electric power for the operation unit 110 can be controlled independently from electric power for the main body 100. Accordingly, only the operation unit 110 can be started up by the OS2. When the imaging unit 16 is started up by the OS2, the OS1 in the main body 100 need not start up the respective functions, and the imaging unit 16 can be started up quickly. Furthermore, since sounds of the respective functions controlled by main body 100 starting up are not produced, the problem that an intruder recognizes an imaging operation can be solved.

<Functional Configuration>

Next, functional configurations of the main body 100 and the operation unit 110 that operate on the different operating systems will be explained.

Figure 4:
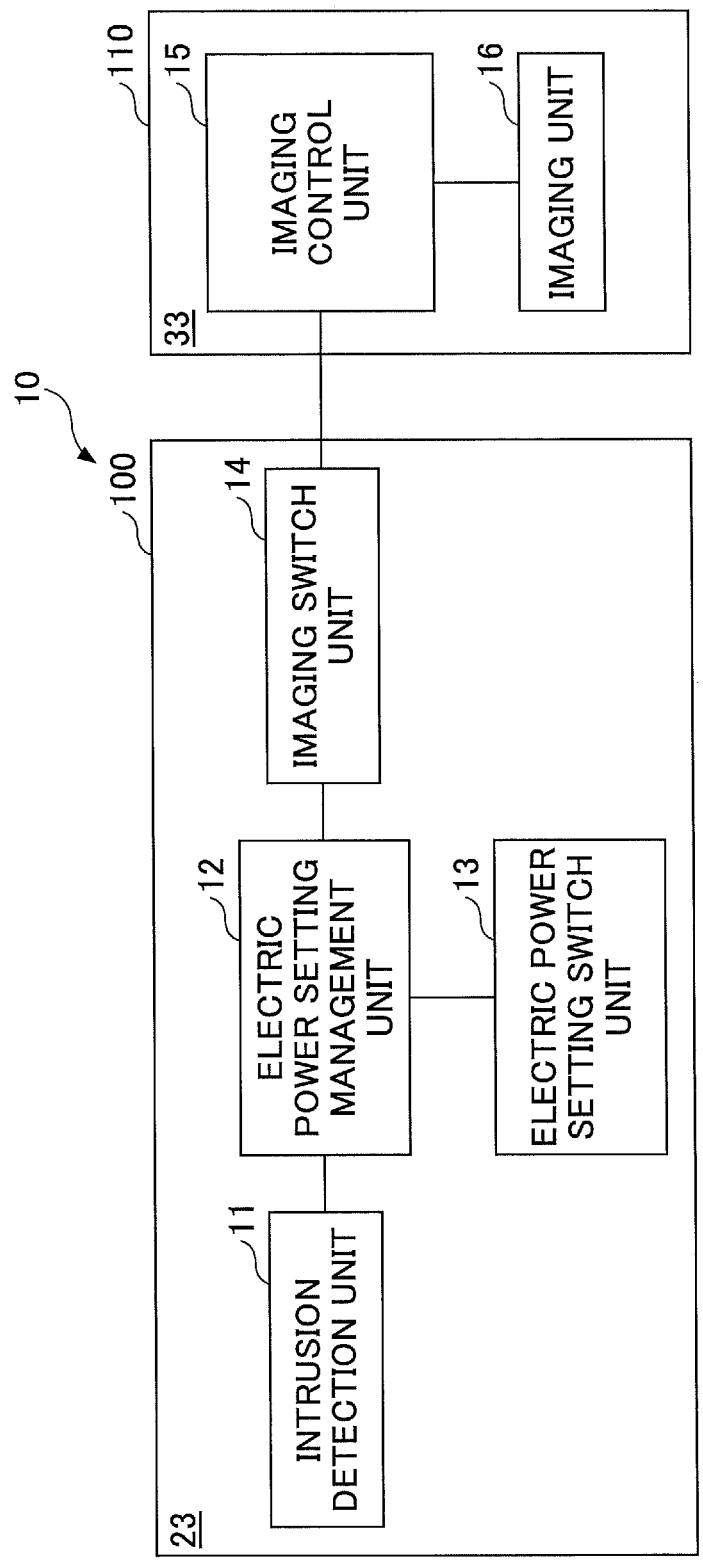
FIG. 4 is a diagram illustrating an example of a functional configuration of the image processing apparatus according to the first embodiment.

FIG. 4 is a diagram illustrating an example of the functional configuration of the image processing apparatus 10 according to the present embodiment. As shown in FIG. 4, the image processing apparatus 10 includes, as functions executed by the OS1 layer 23 of the main body 100, an intrusion detection unit 11, an electric power setting management unit 12 as an example of an imaging mode instruction unit, an electric power setting switch unit 13 and an imaging switch unit 14. Moreover, the image processing apparatus 10 includes, as functions executed by the OS2 layer 33 of the operation unit 110 of the image processing apparatus 10, an imaging control unit 15 and the imaging unit 16.

First, the functions executed by the OS1 layer 23 of the main body 100 will be explained.

The intrusion detection unit 11 is a sensor that detects an intrusion by an intruder into a predetermined area. Especially, the intrusion detection unit 11 is preferably an infrared sensor that detects infrared rays (heat) from a human body.

The electric power setting management unit 12 has a function of performing an instruction to switch an electric power setting to a proper electric power setting out of a normal electric power setting and an energy saving electric power setting. Moreover, the electric power setting management unit 12 also has a function of managing the electric power setting that is set. The normal electric power setting is an electric power mode when the image processing apparatus 10 is normally used by a user, which will be called a normal mode in the following. The energy saving electric power setting is an electric power mode where the respective functions transition to a quiescent operation state (sleep state) after a predetermined time without any operations and the electric power is minimally suppressed, which will be called an energy saving mode in the following.

The electric power setting management unit 12 has a function as an imaging mode instruction unit that does not perform the instruction to switch the electric power setting, in the case where the electric power setting is the energy saving mode when the intruder detection unit 11 detects an intrusion of an intruder, but instructs the imaging switch unit 14 to switch to an imaging mode of imaging the intruder. In the case where the electric power setting is the normal mode, the electric power setting management unit 12 instructs the imaging control unit that has been already started up to start up the imaging unit 16.

The electric power setting switch unit 13 has a function of receiving an instruction to switch an electric power setting from the electric power setting management unit 12 and switching the electric power setting to the normal mode or the energy saving mode.

The imaging switch unit 14 has a function of, upon receiving the instruction to switch the electric energy setting from the electric energy setting management unit 12, instructing the imaging control unit 15 to start up the imaging unit 16 and to switch to the imaging mode, while maintaining the energy saving mode.

Next, the functions executed by the OS2 layer 33 of the operation unit 110 will be explained.

In the case where the electric power setting is the energy saving mode when the imaging control unit 15 receives the instruction to start up the imaging unit 16 from the imaging switch 14, the imaging control unit 15 controls the operation of the imaging unit 16. Moreover, when the imaging control unit 15 receives a start-up instruction, the operation unit 110 is started up by the OS2 layer 33. Moreover, in the case of the normal mode, since the operation unit 110 has been already started up, the operation unit 110 receives an instruction to start up the imaging unit 16 directly from the electric power setting management unit 12 and controls the operation of the imaging unit 16. Incidentally, the operation unit 110 also has a function of, in the case where the imaging unit 16 has been already started up for a face authentication or the like, in the normal mode, making the imaging unit 16 start imaging the intruder.

When the imaging unit 16 includes an imaging annunciation light source, the control of operation, as described above, includes not only starting up the imaging unit 16 to image but also performing a setting to turn off the imaging annunciation light source during the imaging. Moreover, the control of operation includes performing a setting to suppress a production of sounds of operations during the imaging by the imaging unit 16.

The imaging annunciation light source is a lamp that annunciates the imaging, and specifically is a LED (light-emitting diode) element. The imaging control unit 15 is set so as to turn off the imaging annunciation light source when the imaging unit 16 is started up. According to the above setting, a problem that when the imaging annunciation light source is on, the intruder recognizes that the intruder is being imaged and the intruder gets away from the image processing apparatus to a position where the imaging unit cannot image the intruder is solved.

The sounds of operations during imaging are different depending on the imaging unit, and, for example, a shutter sound (in the case of a camera), a start-up annunciation sound of a device, or the like. The imaging control unit 15, upon starting up the imaging unit 16, performs a setting to suppress a production of sounds of operations. According to the above setting, a problem that when sounds of operations are produced, the intruder recognizes that the intruder is being imaged and the intruder gets away from the image processing apparatus to a position where the imaging unit cannot image the intruder is solved.

The imaging unit 16 has a function of imaging a predetermined monitor area when the image processing apparatus 10 is set in the imaging mode. An image that is imaged is converted into image data and sent to the main body 100 every predetermined time. For the imaging unit 16, a video camera that takes a motion picture, a still camera that takes a still image, a CCD (charge-coupled device) camera or the like is used. Especially speaking, an imaging unit that does not have an imaging annunciation light source and does not produce sounds of operations is preferably implemented. The imaging includes a motion picture taken by the video camera or the like, an image such as a photograph taken by the still camera or the like, and will be used in image analysis or the like later.

As described above, the present embodiment has a main feature that only the imaging unit 16 can be started up by the OS2 of the operation unit 110 without changing the electric power setting at the time of intrusion by an intruder. This is because, as described above, the main body 100 that manages and switches the electric power setting and the operation unit 110 that controls the operation of the imaging unit 16 are executed on different operating systems from each other.

Even when the image processing apparatus 10 detects an intruder in a state of the energy saving mode, without returning the respective functions in the main body 100, only the imaging unit 16 can be started up. Furthermore, since the image processing apparatus 10 does not produce a sound of start-up, and the imaging unit 16 does not produce a sound of operation, the intruder does not recognize that the intruder is imaged. Accordingly, the intruder is surely imaged and a security effect is enhanced.

<Procedure of Image Processing>

Figure 5:
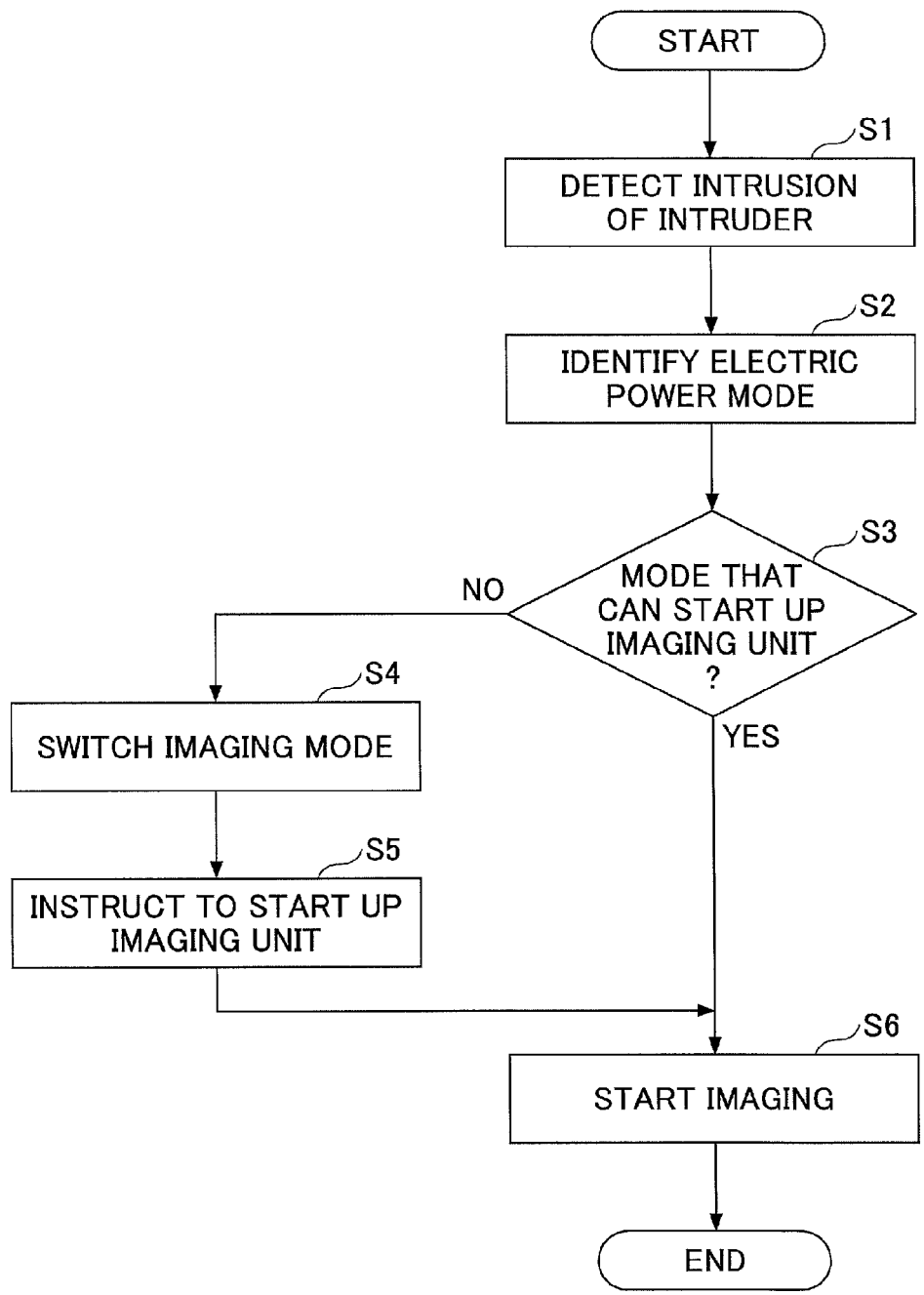
FIG. 5 is a flowchart illustrating an example of a flow of image processing in the image processing apparatus according to the first embodiment.

Next, a flow of the image processing in the image processing apparatus 10 having the above-described configuration will be explained. FIG. 5 shows a flow of processing from the detection of an intruder to the imaging.

The intrusion detection unit 11 upon detecting an intrusion of an intruder gives notice to the electric power setting management unit 12 (step S1).

The electric power setting management unit 12 upon receiving from the intrusion detection unit 11 the notice that the intrusion is detected identifies the present electric power setting (electric power mode), i.e. a "normal mode" or an "energy saving mode" (step S2).

The electric power setting management unit 12 determines whether the present electric power setting can start up the imaging unit 16 (step S3). That is, when it is the "normal mode", the imaging unit 16 can be started up (S3: YES), and when it is the "energy saving mode", the imaging unit 16 cannot be started up (S3: NO).

When the electric power setting is the "energy saving mode" (S3: NO), the electric power setting management unit 12 gives notice to the imaging switch unit 14 of an instruction to switch immediately to the imaging mode without instructing to switch the electric power setting (electric power mode) (step S4).

The imaging switch unit 14 upon receiving the instruction to switch to the imaging mode from the electric power setting management unit 12 while maintaining the electric power setting in the "energy saving mode" gives notice to the imaging control unit 15 of an "imaging unit start-up instruction" to start up the imaging unit 16 (step S5).

In the case where the electric power setting is "normal mode" (step S3: YES), the electric power setting management unit 12 give notice to the imaging control unit 15 of the "imaging unit start-up instruction", and starts the imaging by the imaging unit 16 (step S6).

In the normal mode, since the operation unit 110 that controls the operation of the imaging unit 16 has already been started up and can always start up the imaging unit 16 and start imaging, the operation unit 110 need not instruct the imaging switch unit 14 to switch to the imaging mode. Incidentally, in the case where the imaging unit 16 also has already been started up, the imaging control unit 15, upon receiving the "imaging unit start-up instruction" from the electric power setting management unit 12, makes the imaging unit 16 start the imaging immediately.

Moreover, in the case where the imaging control unit 15 receives the "imaging unit start-up instruction" to start up the imaging unit 16 from the imaging switch unit 14 in step S5, the operation unit 110 is started up in step S6. The imaging control unit 15 starts up the imaging unit 16 and starts the imaging.

Next, a flow of the imaging control unit 15 setting an imaging state of the imaging unit 16 before starting the imaging, upon receiving the "imaging unit start-up instruction" from the electric power setting management unit 12 or the imaging switch unit 14, will be explained. FIG. 6 shows an example of a flow of a setting of the imaging unit 16 by the imaging control unit 15.

The imaging control unit 15 receives the "imaging unit start-up instruction" from the electric power setting management unit 12 or the imaging switch unit 14 (step S60).

The imaging control unit 15, upon receiving the "imaging unit start-up instruction", performs a setting for the imaging unit 16 so as to turn off the imaging annunciation light source (step S61).

The imaging control unit 15 furthermore performs a setting for the imaging unit 16 so as to suppress a production of sounds of operations during the imaging (step S62). For example, a sound volume of a shutter sound or a start-up sound is set to zero level.

According to the respective settings by the imaging control unit 15, as described above, the intruder does not recognize that the intruder is being imaged. Accordingly, the intruder is surely imaged and the security effect is enhanced.

Second Embodiment

FIG. 7 is a diagram illustrating an example of a functional configuration of a security system supplied with an image processing apparatus according to a second embodiment. In the first embodiment, as shown in FIG. 4, all the function parts are included in an image processing apparatus 10.

In the security system supplied with the image processing apparatus according to the second embodiment, a main body 100 having an intrusion detection unit 11 for detecting an intrusion of an intruder or the like is included in the image processing apparatus 10. Different from the first embodiment is that an imaging control unit 15 and an imaging unit 16 are not included in the image processing apparatus 10, but included in an external imaging device 160 which is connected via a network N.

Meanwhile, the second embodiment is the same as the first embodiment except for the above configuration, and an explanation for the same parts will be omitted. Moreover, since a hardware configuration and a software configuration are the same as those in the first embodiment, explanations will be omitted. Moreover, in FIG. 7, to a function part which is the same as or corresponding to that in FIG. 4, the same or corresponding reference numeral is assigned, and duplicate explanation is omitted.

As shown in FIG. 7, the main body 100 included in the image processing apparatus 10 further includes a communication unit 150 that is connected with the network N. Moreover, the external imaging device 160 further includes a communication unit 170 that is connected with the network N, other than the imaging control unit 15 and the imaging unit 16.

The communication unit 150 has a function of instructing to start-up imaging the intruder by sending to the communication unit 170 of the imaging device 160 via the network N an "imaging unit start-up instruction" from an imaging switch unit 14 or an electric power setting management unit 12. Incidentally, the above-described communication unit 150 has a configuration so that the communication with the communication unit 170 in the imaging device 160 is performed by the OS1 layer 23 as shown in FIG. 3.

Incidentally, the network N is not limited to wired or to wireless, but may be the Internet connected by a dedicated line or a telephone line or the like, or may be a form of an intranet to which an Internet technology is applied. Furthermore, even in the case of using the dedicated line, the network N is not limited to a WAN (Wide Area Network) or a MAN (Metropolitan Area Network), but may be a form of a LAN (Local Area Network).

A procedure of the image processing in the security system supplied with the image processing apparatus according to the second embodiment is the same as that in the first embodiment, as shown in FIGS. 5 and 6. An explanation of the procedure of the image processing will be omitted.

Intrinsically, the operation of sending the "imaging unit start-up instruction" from the imaging switch unit 14 or the electric power setting management unit 12 to the imaging control unit 15, shown in steps S5 and S6 in FIG. 5 in the first embodiment corresponds to a transmission of the instruction from the above-described communication unit 150 to the communication unit 170 via the network N.

Accordingly, in the security system supplied—with the image processing apparatus according to the second embodiment, the imaging device is provided separately from the image processing apparatus, and the imaging device can be arranged at a position appropriate for imaging an intruder. Moreover, in the same way as in the first embodiment, even when an intruder is detected in a state of the energy saving mode, without turning on the respective functions in the main body 100, only the imaging unit 16 can be started up to image, and the intruder does not recognize that the intruder is being imaged. Accordingly, the intruder is surely imaged and a security effect is enhanced.

Meanwhile, the image processing apparatus explained in the above-described embodiment can be included in various systems depending on an intended use or a purpose, to create a security system.

<Program>

Moreover, each program executed in an image processing apparatus or in a security system supplied with the image processing apparatus is, as one mode, a file having a installable form or a executable form, recorded in a recording medium readable by a computer, such as a CD-ROM (Compact disc read only memory), a flexible disk (FD), a CD-R (Compact disc recordable) or a DVD (Digital Versatile Disk), and provided. Moreover, the program may be configured so as to be stored on a computer connected with a network such as the Internet, and may be provided by being downloaded via the network. Moreover, respective programs may be provided by being stored preliminary in a ROM or the like.

The program executed in the image processing apparatus or in the security system supplied with the image processing apparatus is configured so that, as actual hardware, by the CPU (processor) reading out a control program from a storage medium and executing it, the respective function parts, as described above, are loaded in a main memory, and the respective function parts are managed in the main memory.

As described above, the embodiments of the present invention are explained in detail with reference to the accompanying drawings. Meanwhile, the above description is for understanding the embodiments, and does not limit the scope of the embodiments. Moreover, the plural embodiments, as described above, are not exclusive with each other. Accordingly, as long as there is no discrepancy, the respective elements of different embodiments are intended to be combinable.

Further, the present invention is not limited to these embodiments, but various variations and modifications may be made without departing from the scope of the present invention.

The present application is based on and claims the benefit of priority of Japanese Priority Applications No. 2013-160500 filed on Aug. 1, 2013 and No. 2014-092233 filed on Apr. 28, 2014, the entire contents of which are hereby incorporated by reference.

What is claimed is:

1. An image processing apparatus comprising:
a memory configured to store one or more programs: and a processor configured to execute the one or more programs, wherein the one or more programs which, when executed by the processor, function as:
an intrusion detection unit configured to detect an intrusion of an intruder;
an imaging unit configured to image a monitor area;
an image control unit configured to activate the imaging unit and to cause the imaging unit to start imaging; and
an imaging instruction unit configured to instruct the image control unit to activate the imaging unit and to cause the imaging unit to start imaging, in a case where the image processing apparatus is in an energy-saving mode, in which the imaging unit is inactive, when the intrusion detection unit detects the intrusion of the intruder, without switching the energy-saving mode to
a normal mode, in which the imaging unit and an image forming unit for forming an image on a recording medium are active.

2. The image processing apparatus as claimed in claim 1, wherein the imaging control unit is configured to operate under a first operating system (OS), which is different from a second operating system (OS), under which the imaging instruction unit operates.

3. The image processing apparatus as claimed in claim 1, wherein the imaging control unit, upon receiving an instruction to activate the imaging unit, is configured to set a light not to be turned on.

4. The image processing apparatus as claimed in claim 1, wherein the imaging control unit, upon receiving an instruction to activate the imaging unit, is configured to set a generation of an operating sound to be inhibited.

5. A security system comprising:
the image processing apparatus as claimed in claim 1; and
an imaging device connected with the image processing apparatus via a network.

6. An image processing method of an image processing apparatus, comprising:
detecting an intrusion of an intruder;
activating an imaging unit and instructing the imaging unit to start imaging, when the image processing apparatus is in an energy-saving mode and the imaging unit is inactive and upon the intrusion of the intruder being detected, without switching the image processing apparatus from the energy-saving mode to a normal mode, in which the imaging unit and an image forming unit for forming an image on a recording medium are active; and
imaging a monitor area with the activated imaging unit.

7. The image processing method as claimed in claim 6, further comprising:
setting, upon receiving an instruction to activate the imaging unit and upon the intrusion of the intruder being detected, a light not to be turned on.

8. The image processing method as claimed in claim 6 further comprising:
setting, upon receiving an instruction to activate the imaging unit and upon the intrusion of the intruder being detected, a generation of an operating sound to be inhibited.

9. A non-transitory computer-readable storage medium storing a program for causing a computer to perform a process of processing an image in an image processing apparatus, the process comprising:
detecting an intrusion of an intruder;
activating an imaging unit and instructing the imaging unit to start imaging, when the image processing apparatus is in an energy-saving mode and the imaging unit is inactive and upon the intrusion of the intruder being detected, without switching the image processing apparatus from the energy-saving mode to a normal mode, in which the imaging unit and an image forming unit for forming an image on a recording medium are active; and
imaging a monitor area with the activated imaging unit.

10. The non-transitory computer-readable storage medium as claimed in claim 9, wherein the process further comprises:
setting, upon receiving an instruction to activate the imaging unit and upon the intrusion of the intruder being detected, a light not to be turned on.

11. The non-transitory computer-readable storage medium as claimed in claim 9, wherein the process further comprises:
setting, upon receiving an instruction to activate the imaging unit and upon the intrusion of the intruder being detected, a generation of an operating sound to be inhibited.

* * * * *